(12) United States Patent
Mensi et al.

(10) Patent No.: US 7,248,096 B2
(45) Date of Patent: Jul. 24, 2007

(54) CHARGE PUMP CIRCUIT WITH DYNAMIC BIASING OF PASS TRANSISTORS

(75) Inventors: Luca Mensi, Marcheno (IT); Anna Richelli, Brescia (IT); Luigi Colalongo, Bologna (IT); Zsolt Miklos Kovacs-Vajna, Concesio (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 59 days.

(21) Appl. No.: 10/995,017

(22) Filed: Nov. 22, 2004

(65) Prior Publication Data

US 2006/0109047 A1    May 25, 2006

(51) Int. Cl.
*G05F 1/10* (2006.01)
(52) U.S. Cl. ...................................... 327/536
(58) Field of Classification Search ................ 327/530, 327/534, 535, 536, 537
See application file for complete search history.

(56) References Cited

U.S. PATENT DOCUMENTS

| | | | |
|---|---|---|---|
| 5,412,257 | A | 5/1995 | Cordoba et al. |
| 5,982,224 | A | 11/1999 | Chung et al. |
| 6,107,864 | A | 8/2000 | Fukushima et al. |
| 6,967,523 | B2 * | 11/2005 | DeMone ............... 327/537 |
| 2005/0206441 | A1 * | 9/2005 | Kimura ................. 327/536 |
| 2005/0264342 | A1 * | 12/2005 | Shin et al. ............. 327/536 |
| 2006/0028266 | A1 * | 2/2006 | Tobita ................. 327/536 |
| 2006/0061410 | A1 * | 3/2006 | Chiu et al. ............ 327/536 |

FOREIGN PATENT DOCUMENTS

| | | |
|---|---|---|
| EP | 0 836 268 | 4/1998 |
| EP | 1 326 258 | 7/2003 |

(Continued)

OTHER PUBLICATIONS

Jong-Shin Shin, In-Young Jung, Hong-Sik Min, and Young-June Park, "A New Low Pump Circuit with No Output Voltage Loss by MOSFET VT," The 11th Korean Conference on Semiconductors, Feb. 19-20, 2004, pp. 79-80.*

(Continued)

*Primary Examiner*—Jeffrey Zweizig
(74) *Attorney, Agent, or Firm*—Lisa K. Jorgenson; Stephen Bongini; Fleit Kain Gibbons Gutman Bongini & Bianco P.L.

(57) ABSTRACT

A two-phase charge pump is provided that is controlled by first and second clock signals in phase-opposition. The charge pump has a sequence of cascade-connected stages. Each stage includes a capacitive element driven by one clock signal such that capacitive elements of adjacent stages are driven by different clock signals, a pass transistor that transfers electric charge to the capacitive element from the capacitive element of a previous stage, a first biasing circuit that enables the pass transistor during a first phase of the one clock signal, and a second biasing circuit that disables the pass transistor during a second phase of the one clock signal. Also provided is a two-phase charge pump having two branches that each include a sequence of such cascade-connected stages, with each stage of one branch having a corresponding stage in the other branch. A method of operating two-phase charge pumps is also provided.

21 Claims, 10 Drawing Sheets

FOREIGN PATENT DOCUMENTS

JP 08-322241 12/1996

OTHER PUBLICATIONS

Jong-Shin Shin, A New Charge Pump with No Output Degradation Due to Threshold Voltage, The 11th Korean Conference on Semiconductors in Muju Resort, Feb. 19-20, 2004.*

John F. Dickson, "On-Chip High-Voltage Generation in MNOS Integrated Circuits Using an Improved Voltage Multiplier Technique", IEEE Journal of Sol.d State Circuits, vol. 11, No. 2, pp. 374-378, Jun. 1976.

Giuseppe Di Cataldo et al., "Double and Triple Charge Pump for Power IC: Dynamical Models which Take Effects into Account", IEEE Journal of Solid State Circuits, vol. 40, No. 2, pp. 92-101, Feb. 1993.

Toni Tanzawa et al., "A Dynamic Analysis of the Dickson Charge Pump Circuit", IEEE Journal of Solid State Circuits, vol. 32, No. 8, pp. 1231-1240, Aug. 1997.

Christl Lauterbach et al., "Charge Sharing Concept and New Clocking Scheme for Power Efficiency and Electromagnetic Emission Improvement of Boosted Charge Pumps", IEEE Journal of Solid State Circuits, vol. 35, No. 5, May 2000.

Jongshing Shin et al., "A New Charge Pump Without Degradation in Threshold Voltage Due to Body Effect", IEEE Journal of Solid State Circuits, vol. 35, No. 8, Aug. 2000.

Roberto Pelliconi et al., "Power Efficient Charge Pump in Deep Submicron Standard CMOS Technology", IEEE Journal of Solid State Circuits, vol. 38, No. 6, Jun. 2003.

Osama Khouri et al., "Low Output Resistance Charge Pump for Flash Memory Programming", 2001.

Roberto Chiarini, "Integrated Charge Pump Design with Low Noise Regulation for the Reading of Multilevel FLASH Memories Having 1.2V Supplies and Realized with 130nm Technology", Universita degli Studi di Brescia, Facoltà di Ingegneria Dipartimento di Elettronica per l'Automazione. Anno Accademico 2001/2002.

* cited by examiner ions of them by the circuit for the adjacent pumping capacitors are always
CHARGE PUMP CIRCUIT WITH DYNAMIC BIASING OF PASS TRANSISTORS

FIELD OF THE INVENTION

The present invention relates to charge pump circuits, and more specifically to a two-phase charge pump and a method of operating a two-phase charge pump.

BACKGROUND OF THE INVENTION

A charge pump is a particular voltage booster circuit, which is used to generate a voltage higher than its power supply voltage. For example, charge pumps commonly find application in an integrated circuit including a non-volatile memory with floating-gate transistors. In this case, a high-voltage is needed to program and/or erase the memory. In order to avoid the need to provide an external power supply voltage of high value, the integrated circuit is designed to have one or more internal charge pumps for producing the high-voltage from the (lower) power supply voltage.

Operation of a charge pump is based on the continuous accumulation and transfer of electric charge in a sequence of pumping capacitors, which are connected through corresponding switching elements. Particularly, each pumping capacitor has a free terminal, which is controlled by a signal switching between a low-voltage and a high-voltage; the control signals of adjacent pumping capacitors are always anti-phase. In this way, when the control signal is at the low-voltage the pumping capacitor is charged by the previous pumping capacitor; when the control signal switches to the high-voltage, the accumulated charge is transferred to the next pumping capacitor.

A classic implementation of the charge pump in which the switching elements consist of diodes is described in John F. Dickson, "On-Chip High-voltage Generation in NMOS Integrated Circuits Using an Improved Voltage Multiplier Technique", IEEE Journal of Solid State Circuits, vol. 11, no. 2, pp. 374-378, June 1976, the entire disclosure of which is herein incorporated by reference. A drawback of this charge pump is the unavoidable loss in its output voltage due to the threshold voltage and to the conduction resistance of the diodes. This drawback is exacerbated by increasing the number of stages of the charge pump, because each additional stage further decrements the output voltage.

Alternatively, the diodes are replaced with pass transistors. For example, each pass transistor can be an NMOS transistor having the drain terminal connected to an input of the stage and the source terminal connected to an output of the stage; the gate terminal of the pass transistor is controlled by a signal that maintains the gate to source voltage of the pass transistor higher than its threshold value during the increasing of the source voltage due to the charge transfer process. A known solution for obtaining this result is to use a four-phase architecture, with two additional control signals dedicated to over driving the gate terminals of the pass transistors. This solution, however, requires a more complex circuit for the generation of the control signals.

A different solution with a two-phase architecture is based on the use of pass transistors of the low-voltage type, which exhibit a reduced threshold voltage. In this case, the output resistance of the charge pump (whose value influences the efficiency of the entire circuit) can be favorably reduced by increasing its operating frequency and using transistors with lower parasitic capacitances. Furthermore, it is possible to use smaller pumping capacitors, thus saving silicon area on the chip. However, it is necessary to introduce a dedicated circuit architecture that allows the utilization of low-voltage transistors (typically based on two cross-coupled branches). An example of such a charge pump is described in R. Pelliconi et al., "Power Efficient Charge Pump in Deep Submicron Standard CMOS Technology", IEEE Journal of Solid State Circuits, vol. 38, no. 6, June 2003, the entire disclosure of which is herein incorporated by reference. According to this document, in each stage the charge transfer occurs through the use of two pass transistors of opposite type at a time; as a result, the effects of their threshold voltages are canceled (being of opposite signs). However, the two pass transistors that are series connected in each stage double its conductive resistance.

Japanese Patent Laid-Open Publication No. 08-322241, the entire disclosure of which is herein incorporated by reference, illustrates a solution for solving the threshold voltage loss drawback (in a two-phase charge pump of the high-voltage type) using a dynamic system for biasing the pass transistors. Particularly, each pass transistor is a PMOS transistor having the source terminal connected to the input of the stage and the drain terminal connected to the output of the stage. The gate terminal of the pass transistor is selectively connected to the input of the preceding stage (to turn it on), or to the output of the stage (to turn it off). This solution, however, is not suitable for use with low-voltage transistors that withstand a gate to source voltage swing at most equal to the supply voltage. In the circuit architecture proposed by this solution, each pass transistor is driven by a gate to source voltage that is higher than the supply voltage (particularly, equal to twice the supply voltage).

SUMMARY OF THE INVENTION

In view of these drawbacks, it is an object of the present invention to overcome these drawbacks and to provide an improved two-phase charge pump circuit with dynamic biasing of pass transistors.

Another object of the present invention is to provide an improved method for operating a two-phase charge pump circuit.

One embodiment of the present invention provides a two-phase charge pump controlled by first and second clock signals that are in phase-opposition. The charge pump includes a sequence of cascade-connected stages. Each of the stages includes a capacitive element driven by one clock signal, a pass transistor coupled to the capacitive element, a first biasing circuit enabling the pass transistor during a first phase of the one clock signal, and a second biasing circuit disabling the pass transistor during a second phase of the one clock signal. The first biasing circuit couples the one clock signal to the pass transistor. The capacitive elements of adjacent stages are driven by different clock signals, and the pass transistor selectively transfers electric charge to the capacitive element from the capacitive element of a previous stage.

Another embodiment of the present invention provides a two-phase charge pump has two branches. Each of the branches includes a sequence of cascade-connected stages, with each stage of one branch having a corresponding stage in the other branch. Each of the stages includes a capacitive element driven by one clock signal, a pass transistor coupled to the capacitive element of the stage, a first biasing circuit enabling the pass transistor of the stage during a first phase of the one clock signal, and a second biasing circuit disabling the pass transistor of the stage during a second phase of the one clock signal. The first biasing circuit couples an input voltage of the corresponding stage to the pass transistor of the stage. The capacitive elements of adjacent stages of each branch are driven by different clock signals, and the pass transistor selectively transfers electric charge to the capacitive element of the stage from the capacitive element of a previous stage.

Further embodiments of the present invention provide corresponding methods of operating a two-phase charge pump.

The characterizing features of the present invention are set forth in the appended claims. The invention itself, however, as well as further features and advantages thereof will be best understood by reference to the following detailed description, given purely by way of a non-restrictive indication, to be read in conjunction with the accompanying drawings.

DETAILED DESCRIPTION OF PREFERRED EMBODIMENTS

Figure 1A:
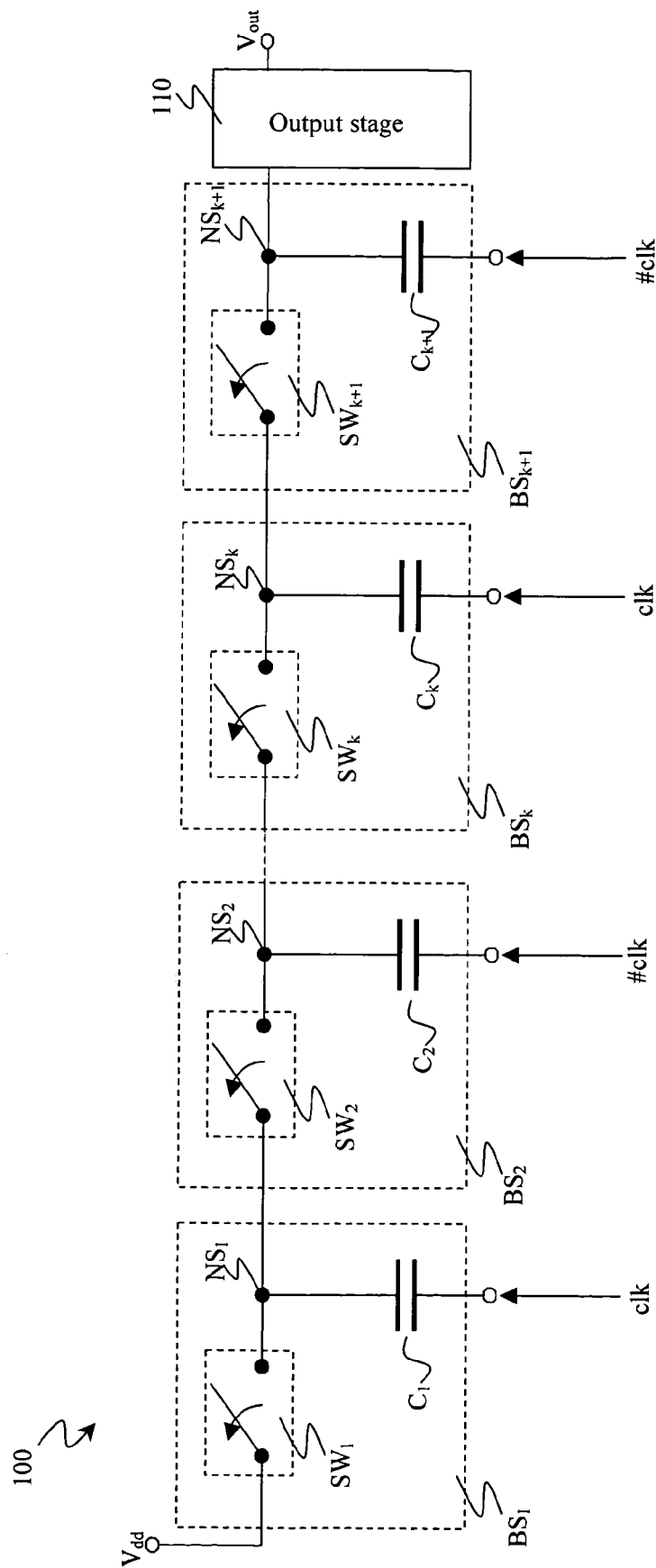
FIG. 1A is a circuit diagram of a high-voltage charge pump.

Preferred embodiments of the present invention will be described in detail hereinbelow with reference to the attached drawings.

One preferred embodiment of the present invention provides a two-phase charge pump, which is suitable to be controlled by a first clock signal and a second clock signal. Each clock signal periodically has a first value and a second value during a first phase and a second phase, respectively; the first and the second clock signals are in phase-opposition. The charge pump has a sequence of cascade-connected stages. Each stage includes a capacitive element that is driven by a corresponding one of the clock signals; the capacitive elements of each pair of adjacent stages are driven by different clock signals. A pass transistor is used for transferring electric charge to the capacitive element of the stage from the capacitive element of a previous stage. The stage further includes a first biasing circuit for enabling the pass transistor during the first phase of the clock signal, and a second biasing circuit for disabling the pass transistor during the second phase of the clock signal. The first biasing circuit includes means for applying the clock signal to the pass transistor.

In this way, the voltage boosting process is done without relevant losses due to the threshold voltages of the pass transistors; at the same time, this result is achieved with a simple two-phase architecture.

This structure increases overdrive of each pass transistor moving toward the output of the charge pump (with a corresponding reduction of its conduction resistance).

The following exemplary embodiments of the present invention provide additional advantages.

For example, according to one embodiment of the present invention, the first biasing circuit includes means for selectively connecting the control terminal of the pass transistor to a clock terminal providing the clock signal.

Preferably, the first biasing circuit includes a first biasing transistor of a type different from that of the pass transistor.

Preferably, the second biasing circuit includes means for selectively connecting the control terminal of the pass transistor to the capacitive element.

In some embodiments, the second biasing circuit includes a second biasing transistor (of the same type as the pass transistor).

Preferably, each transistor is of the MOSFET type.

An embodiment that provides further improvements reduces the size factor of each pass transistor (with respect to the preceding one).

Indeed, the increasing overdrive of the pass transistors allows maintaining the same conduction resistance in all the stages; therefore, this structure involves a reduction of size of the charge pump and of the parasitic capacitance of the pass transistors.

In an alternative embodiment of the present invention, the charge pump has two branches. Each branch includes a sequence of cascade-connected stages; each stage belonging to a branch has a corresponding stage in the other branch. Each stage includes a capacitive element that is driven by a corresponding one of the clock signals; the capacitive elements of each adjacent stage and of the corresponding stage are driven by a different clock signal. A pass transistor is used for transferring electric charge to the capacitive element of the stage from the capacitive element of a previous stage. The stage further includes a first biasing circuit for enabling the pass transistor during the first phase of the clock signal, and a second biasing circuit for disabling the pass transistor during the second phase of the clock signal. The first biasing circuit includes means for applying an input voltage of the corresponding stage to the pass transistor.

In this way, the charge pump can also be implemented using low-voltage transistors (with the corresponding advantages).

The exemplary structures described above for the first and second biasing circuit are also suitable for use with this alternative embodiment.

The present invention also provides corresponding methods of operating a two-phase charge pump.

Exemplary embodiments of the present invention will now be described in detail with reference to FIGS. 1A-9B.

FIG. 1A is a simplified circuit diagram of a high-voltage charge pump. As shown in the figure, the charge pump circuit 100 comprises a plurality of booster stages $BS_n$ (where n=1 to k+1) connected in series; a last booster stage $BS_{k+1}$ is connected to an output stage 110. Each booster stage $BS_n$ comprises a controlled switch $SW_n$ and a pumping capacitor $C_n$. A terminal of the pumping capacitor $C_n$ is connected to a terminal (node $NS_n$) of the corresponding controlled switch $SW_n$; the other terminal of the pumping capacitor $C_n$ receives a clock signal clk (in odd-numbered booster stages), or a clock signal #clk (in even-numbered booster stages). The first booster stage $BS_1$ has another terminal of the corresponding controlled switch $SW_1$ connected to a terminal providing the power supply voltage $V_{dd}$ of the charge pump circuit 100 (for example, 1.2-3V). Other booster stages $BS_n$ (n=2 to k+1) each have the other terminal of the controlled switch $SW_n$ connected to the node $NS_{n-1}$ of the preceding booster stage $BS_{n-1}$. The node $NS_{k+1}$ of the last booster stage $BS_{k+1}$ is connected to the output stage 110 that provides an output voltage $V_{out}$. The clock signals clk and #clk alternately take a value equal to the power supply voltage $V_{dd}$ or to a reference voltage (e.g., ground); the clock signals clk and #clk always provide mutually complementary values.

Figure 1B:
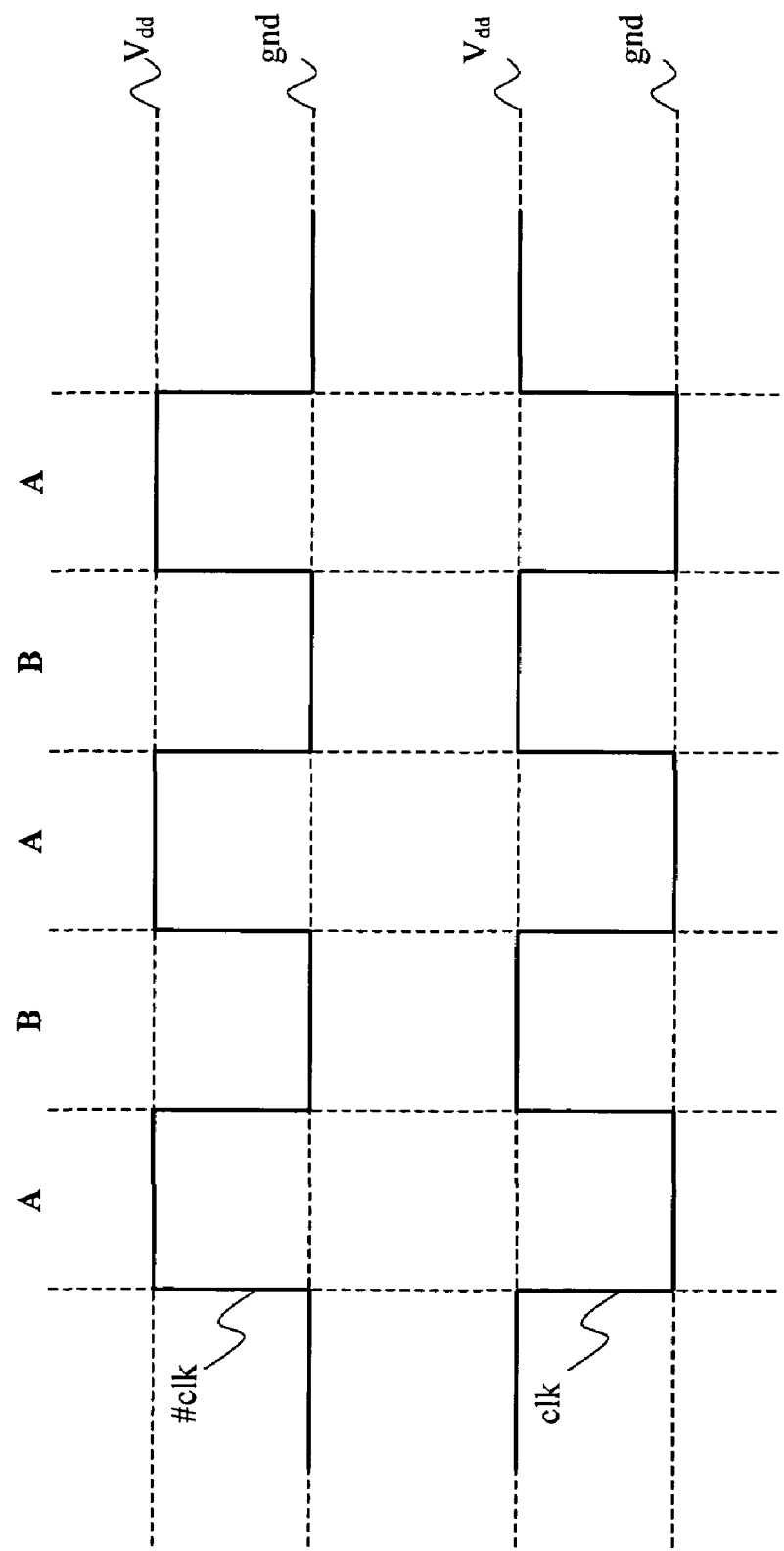
FIG. 1B is a diagram showing the waveforms of the clock signals controlling the charge pump.

Particularly, referring to FIG. 1B, the operation of each booster stage $BS_n$ is described below with reference to two temporal semi-periods A and B of the clock signals clk and #clk. In semi-period A, the clock signal clk provides the ground voltage and the clock signal #clk provides the voltage $V_{dd}$. In semi-period B, the clock signal clk provides the voltage $V_{dd}$ and the clock signal #clk provides the ground voltage.

In the charge pump circuit 100 thus comprised, the controlled switches $SW_n$ in the odd-numbered stages and those in the even-numbered stages alternately open and close with the periodic change in the clock signals clk and #clk, and thus sequentially send a charge accumulated in the pumping capacitor $C_n$ to the next booster stage $BS_{n+1}$. More particularly, during the semi-period A the controlled switches $SW_n$ in the odd-numbered stages are closed and the controlled switches $SW_n$ in the even-numbered stages are open; while, during the semi-period B, the controlled switches $SW_n$ in the even-numbered stages are closed and the controlled switches $SW_n$ in the odd-numbered stages are open.

As a consequence, during the semi-period A, the pumping capacitor $C_n$ of each odd-numbered stage is charged by its previous stage $BS_{n-1}$ (with the first pumping capacitor $C_1$ being charged by the power supply directly). During the semi-period B, the voltage at the node $NS_n$ of each odd-numbered stage goes to $V_{dd}$ plus the voltage at the pumping capacitor $C_n$ (with the electric charge accumulated in the pumping capacitor $C_n$ that is transferred to the next booster stage $BS_{n+1}$).

Therefore, the first pumping capacitor $C_1$ is charged to a voltage $V_{dd}$, the second pumping capacitor $C_2$ is charged to a voltage $2*V_{dd}$, and so on until the last pumping capacitor $C_{k+1}$, which is charged to a voltage $(k+1)*V_{dd}$. In this way, a corresponding high-voltage boosted from the power supply voltage $V_{dd}$ is ultimately obtained as the final output voltage $V_{out}$ provided by the output stage 110.

Each of the booster stages $BS_n$ is identically configured. Hence, the configuration and operation thereof are described below generally with reference to the nth (numbered n) booster stage $BS_n$ as typical of all booster stages.

Figure 2:
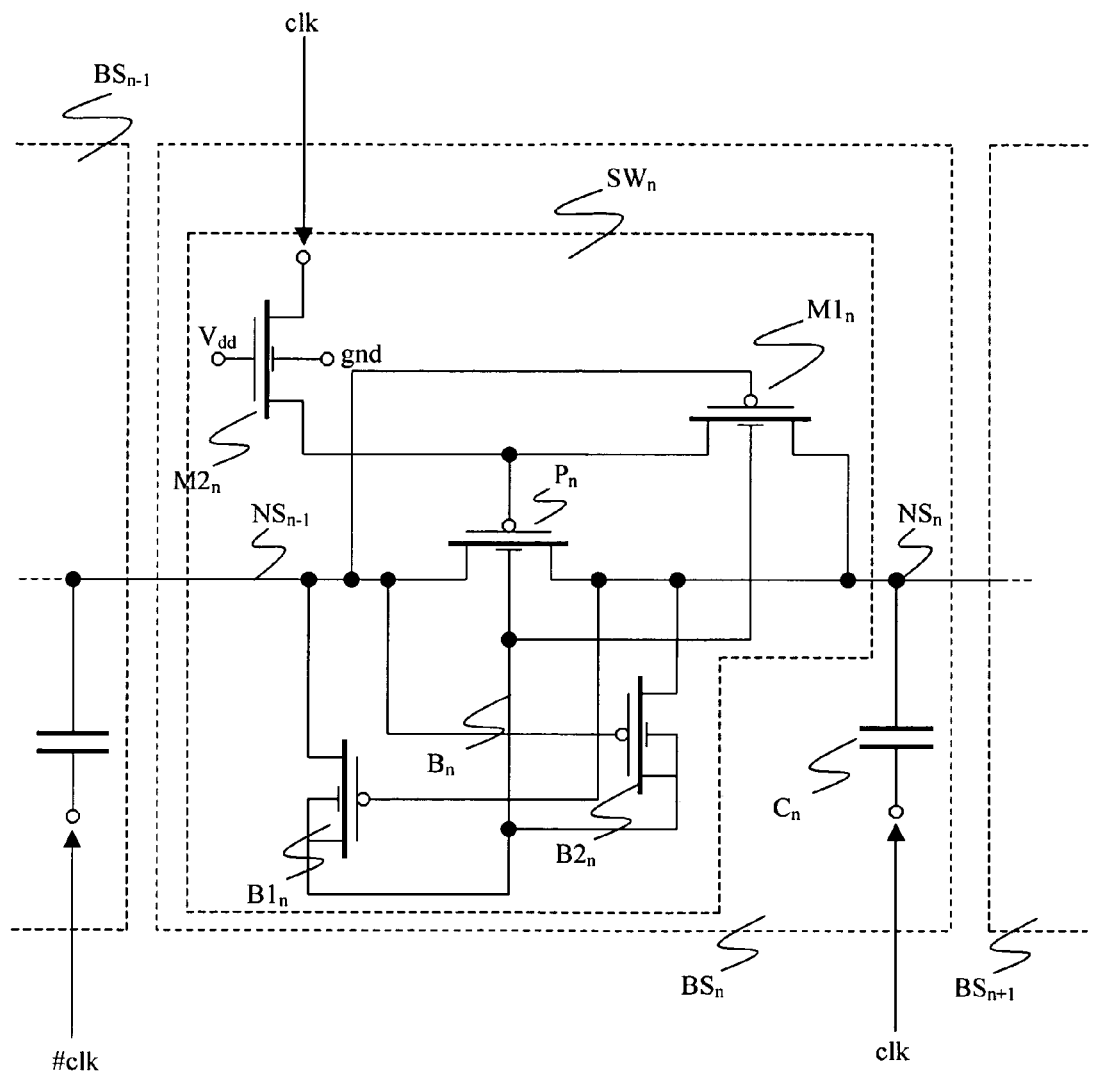
FIG. 2 is a diagram of the architecture of a generic booster stage of the charge pump of FIG. 1A according to a first embodiment of the present invention.

FIG. 2 shows the nth booster stage $BS_n$ according to a first embodiment of the present invention. The booster stage $BS_n$ comprises an input node defined by the node $NS_{n-1}$ of the previous booster stage $BS_{n-1}$ (through which the charge is supplied), and an output node defined by its node $NS_n$, from which the charge is supplied to the input node of the next (downstream) booster stage $BS_{n+1}$.

The pumping capacitor $C_n$ receives the clock signal clk. To explain the operation of the controlled switch $SW_n$, an odd value has been chosen for the index n of the examined booster stage for illustrative purposes (otherwise the capacitor would receive the clock signal #clk).

The controlled switch $SW_n$ includes a PMOS pass transistor $P_n$ for the controlled connection between the input node $NS_{n-1}$ and the output node $NS_n$ of the booster stage $BS_n$. Particularly, the source terminal of the pass transistor $P_n$ is connected to the input node $NS_{n-1}$, the drain terminal is connected to the output node $NS_n$, and the body terminal defines a common-body node $B_n$ of the booster stage $BS_n$. The gate terminal of the pass transistor $P_n$ is connected to the drain terminals of a PMOS transistor $M1_n$ and an NMOS transistor $M2_n$ (whose purpose is to control the opening and closing of the pass transistor $P_n$, as described below). The source terminal of the transistor $M1_n$ is connected to the output node $NS_n$, the body terminal is connected to the common-body node $B_n$, and the gate terminal is connected to the input node $NS_{n-1}$. The source terminal of the transistor $M2_n$ receives the clock signal clk, the body terminal is connected to a reference terminal providing the ground voltage, and the gate terminal is connected to a power supply terminal providing the voltage $V_{dd}$. The controlled switch $SW_n$ further includes two PMOS transistors $B1_n$ and $B2_n$ (whose purpose is to correctly bias the body terminal of the pass transistor $P_n$, as described below). The source terminal of the transistor $B1_n$ is connected to the input node $NS_{n-1}$, the drain terminal and the body terminal are connected to the common-body node $B_n$, and the gate terminal is connected to the output node $NS_n$. The source terminal of the transistor $B2_n$ is connected to the output node $NS_n$, the drain terminal and the body terminal are connected to the common-body node $B_n$, and the gate terminal is connected to the input node $NS_{n-1}$.

The operation of the charge-pump 100 will be described in the following with the assumption that no load is connected to its output terminal (and then no current is sunk).

During the semi-period B, the clock signal clk takes a value equal to the power supply voltage $V_{dd}$ and capacitively pulls up the voltage of the output node $NS_n$ by $V_{dd}$. At the same time, the voltage of the input node $NS_{n-1}$ is pulled down by $V_{dd}$ by the clock signal #clk of the previous booster stage $BS_{n-1}$ (that during semi-period B takes the ground value). In this phase, the transistor $M2_n$ turns off because its gate to source voltage is brought to zero, and the transistor $M1_n$ turns on because its gate to source voltage is brought to $V_{dd}$. The conducting transistor $M1_n$ charges the gate terminal of the pass transistor $P_n$ toward the voltage taken by the output node $NS_n$. In this way the pass transistor $P_n$ turns off, and thus the charge transfer between pumping capacitors $C_{n-1}$ and $C_n$ is prevented (the pumping capacitor $C_{n-1}$ is charged by the previous stage).

At the same time, the transistor $B1_n$ turns off, because its gate terminal has a voltage higher than the voltage of its source terminal. The transistor $B2_n$ turns on, because its gate terminal has a voltage lower than the voltage of its source terminal. The transistor $B2_n$ short-circuits the body and the drain terminals of the pass transistor $P_n$, so as to avoid having its body terminal float.

During the semi-period A, the clock signal clk takes the ground value (and the clock signal #clk takes a voltage equal to the voltage $V_{dd}$). The transistor $M1_n$ turns off, because of a voltage jump of $V_{dd}$ on its gate terminal, provided by the input node $NS_{n-1}$, that is capacitively pulled up by the clock signal #clk. The transistor $M2_n$ turns on, because its gate to source voltage is brought to $V_{dd}$. Consequently, the gate terminal of the pass transistor $P_n$ is discharged toward ground by the transistor $M2_n$; therefore, the pass transistor $P_n$ turns on, and thus the charge transfer from the pumping capacitor $C_{n-1}$ to the pumping capacitor $C_n$ is enabled.

At the same time, the transistor $B1_n$ turns on, because its gate terminal has a voltage lower than the voltage of its source terminal. The transistor $B2_n$ turns off, because its gate terminal has a voltage higher than the voltage of its source terminal. The transistor $B1_n$ short-circuits the body and the source terminals of the pass transistor $P_n$, so as to prevent a body-effect (that is, an increasing of the threshold voltage of the pass transistors moving toward the output stage of the charge pump due to the voltage difference between the body terminal and the source terminal). This arrangement is explained in more detail in J. Shin et al., "A New Charge Pump Without Degradation in Threshold Voltage Due to Body Effect", IEEE Journal of Solid State Circuits, vol. 35, no. 8, August 2000, the entire disclosure of which is herein incorporated by reference.

When turned on, the pass transistor $P_n$ has a gate to source voltage (denoted with $V_{gs}$) that is a function of n (so it depends on the considered booster stage $BS_n$). In fact, while the gate terminal of the pass transistor $P_n$ of any booster stage $BS_n$ is brought to ground by the turning on of the transistor $M2_n$, the source voltage of the pass transistor $P_n$ is the one of the input node $NS_{n-1}$ of the corresponding booster stage $BS_n$, that is equal to $n*V_{dd}$. In this way, the charge transfer from a pumping capacitor to the pumping capacitor belonging to the next adjacent booster stage is done without any substantial voltage loss due to the threshold voltage $V_{th}$ of the pass transistor $P_n$. In fact, the gate to source voltage of the pass transistors $P_n$, that is $n*V_{dd}$, is always sufficient for maintaining the pass transistor $P_n$ turned on during the charge accumulation on the output node $NS_n$, that represents the drain terminal of the pass transistor $P_n$; moreover, according to this embodiment, the overdrive voltage ($V_{gs}$-$V_{th}$) of each pass transistor $P_n$ increases as n increases.

Even the voltage loss due to the unavoidable conduction resistance $RC_n$ of the pass transistor $P_n$ depends on its gate to source voltage $V_{gs}$. More particularly, it is given by the following equation.

$$RC_n \div \frac{1}{\frac{W}{L}(V_{gs} - V_{th})} = \frac{1}{\frac{W}{L}(nV_{dd} - V_{th})}$$

where W/L represents the shape factor of the pass transistor $P_n$. Therefore, the conduction resistance $RC_n$ of each pass transistor $P_n$ decreases as n increases. As a result, it is possible to realize the pass transistors $P_n$ with a shape factor (W/L) that is smaller and smaller, as n rises, maintaining equal their conduction resistance $RC_n$. The parasitic capacitance of the pass transistors then lowers accordingly; moreover, this structure allows a savings in silicon area on the chip.

The circuit structure of the output stage 110 (a non-boosting stage, i.e., without any pumping capacitor) is similar to a classic output stage of a charge pump. Particularly, the controlled switch is formed by a PMOS pass transistor that is diode-connected, with a body dynamic bias structure equal to that represented in FIG. 2 by the transistors $B1_n$ and $B2_n$.

The embodiment of the charge pump presented in FIGS. 1A and 2 is suitable only for "high-voltage" transistors, that is for transistors that support gate to source voltages $V_{gs}$ higher than the supply voltage $V_{dd}$ (for example, 5-8V).

The output voltage $V_{out}$ reached by the charge pump circuit 100, in the condition of absence of load (that is, in absence of output current from the output terminal), is equal to the following.

$$V_{out} = V_{dd} + V_{dd}\left(\frac{C_1}{C_1 + C_{S1}} + \cdots + \frac{C_k}{C_k + C_{Sk}} + \frac{C_{k+1}}{C_{k+1} + C_{S(k+1)}}\right) - V_{th}$$

where the parameters $C_{si}$ (i=1 to k+1) represent the parasitic capacitances of each node $NS_i$ of the charge pump circuit 100. According to this equation, the output voltage $V_{out}$ obtained is not equal to $V_{dd}+(k+1)V_{dd}$, because of the voltage losses due to the parasitic capacitive dividers of each booster stage and to the threshold voltage value of the output stage.

Figure 3:
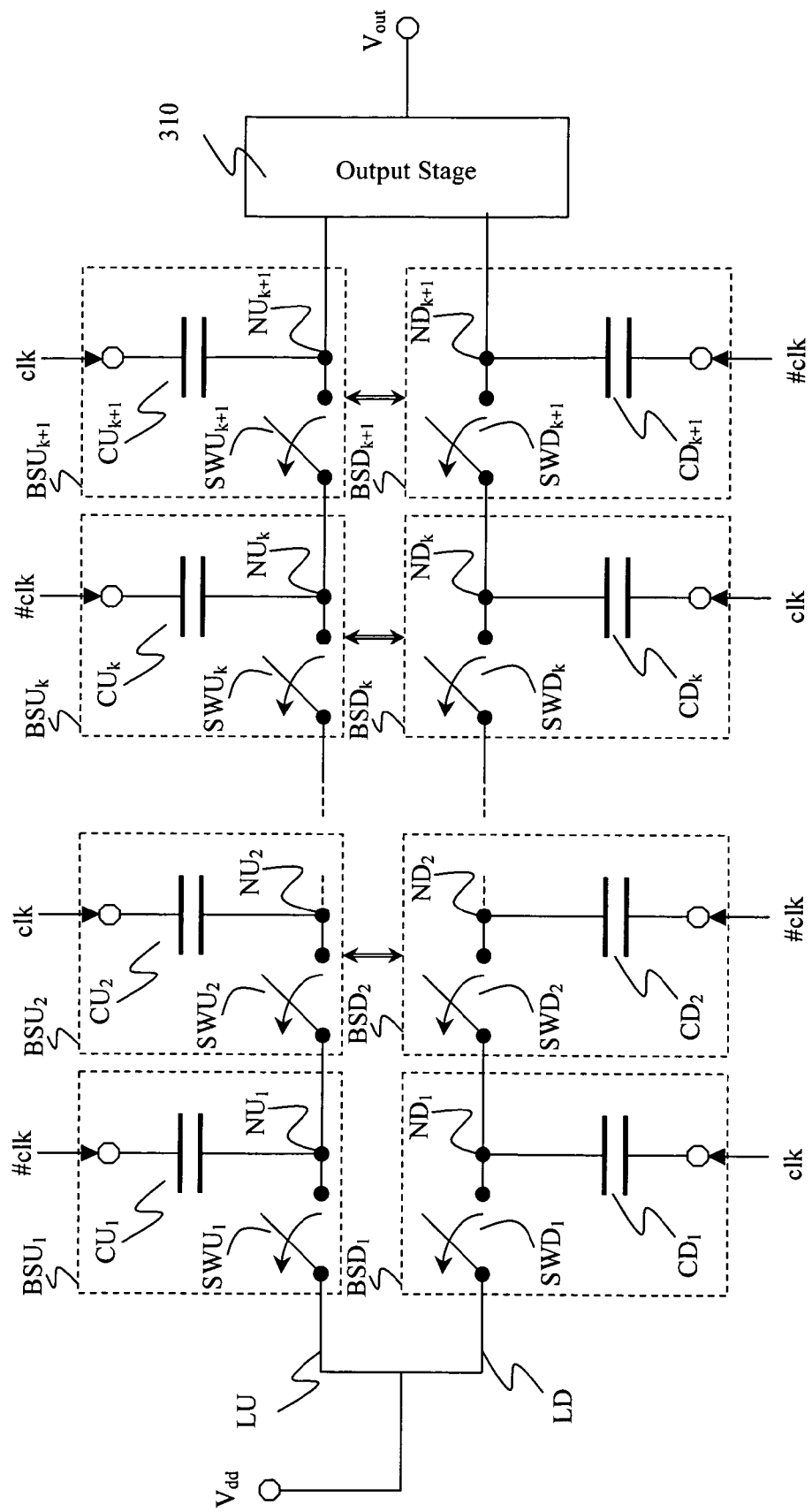
FIG. 3 is a circuit diagram of a low-voltage charge pump.

FIG. 3 shows a simplified version of a low-voltage charge pump according to an embodiment of the present invention. The elements corresponding to those shown in FIG. 1A and FIG. 1B are denoted with the same references, and their explanation is omitted for the sake of brevity. As shown in the figure, the charge pump circuit 300 comprises a plurality of booster stages $BSU_n$ and $BSD_n$ (where n=1 to k+1) disposed in two branches LU and LD. Particularly, the upper booster stages $BSU_n$ are connected in series along the upper brunch LU, while the lower booster stages $BSD_n$ are connected in series along the lower branch LD. The last booster stages $BSU_{k+1}$ and $BSD_{k+1}$ are both connected to an output stage 310. Each booster stage $BSU_n$, $BSD_n$ comprises a controlled switch ($SWU_n$ and $SWD_n$, respectively) and a pumping capacitor ($CU_n$ and $CD_n$, respectively). Considering the upper branch LU, a terminal of the pumping capacitor $CU_n$ is connected to a terminal (node $NU_n$) of the controlled switch $SWU_n$ of the corresponding upper booster stage $BSU_n$, while the other terminal of the pumping capacitor $CU_n$ receives the clock signal #clk in odd-numbered stages or the clock signal clk in even-numbered stages. Considering the lower branch LD, a terminal of the pumping capacitor $CD_n$ is connected to a terminal (node $ND_n$) of the controlled switch $SWD_n$ of the corresponding lower booster stage $BSD_n$, while the other terminal of the pumping capacitor $CD_n$ receives the clock signal clk in odd-numbered stages or the clock signal #clk in even-numbered stages.

The first booster stage $BSU_1$ and $BSD_1$ has another terminal of the corresponding controlled switch $SWU_1$ and $SWD_1$ connected to a terminal providing the power supply voltage $V_{dd}$ of the charge pump circuit 300 (for example, 1.2-3V). Other booster stages $BSU_n$ and $BSD_n$ (n=2 to k+1) each have the other terminal of the controlled switch $SWU_n$ and $SWD_n$ connected to the node $NU_{n-1}$ and $ND_{n-1}$ of the preceding booster stage $BSU_{n-1}$ and $BSD_{n-1}$. The node $NU_{k+1}$ and $ND_{k+1}$ of the last booster stage $BSU_{k+1}$ and $BSD_{k+1}$ is connected to the output stage 310.

During the semi-period A, the controlled switches $SWD_n$ in the odd-numbered lower stages are closed, and the controlled switches $SWD_n$ in the even-numbered lower stages are open; conversely, the controlled switches $SWU_n$ in the even-numbered upper stages are closed and the controlled switches $SWU_n$ in the odd-numbered upper stages are open.

During the semi-period B, the controlled switches $SWD_n$ in the odd-numbered lower stages are open, and the controlled switches $SWD_n$ in the even-numbered lower stages are closed; conversely, the controlled switches $SWU_n$ in the even-numbered upper stages are open and the controlled switches $SWU_n$ in the odd-numbered upper stages are closed.

Consequently, the charge transfer sequence of each branch LU and LD is similar to that examined in the first embodiment (even though they occur in phase opposition).

Referring once more to FIG. 3, the corresponding booster stages $BSU_n$ and $BSD_n$ with the same index n in the two branches LU and LD (apart from the first ones $BSU_1$ and $BSD_1$) are connected to each other for the correct biasing of their controlled switches $SWU_n$ and $SWD_n$, as described below.

Each pair of corresponding booster stages $BSU_n$ and $BSD_n$ (except $BSU_1$ and $BSD_1$) is identically configured. Hence, the configuration and operation thereof are described below with reference to the nth (numbered n) booster stage pair $BSU_n$ and $BSD_n$ as typical of all pairs of booster stages.

Figure 4:
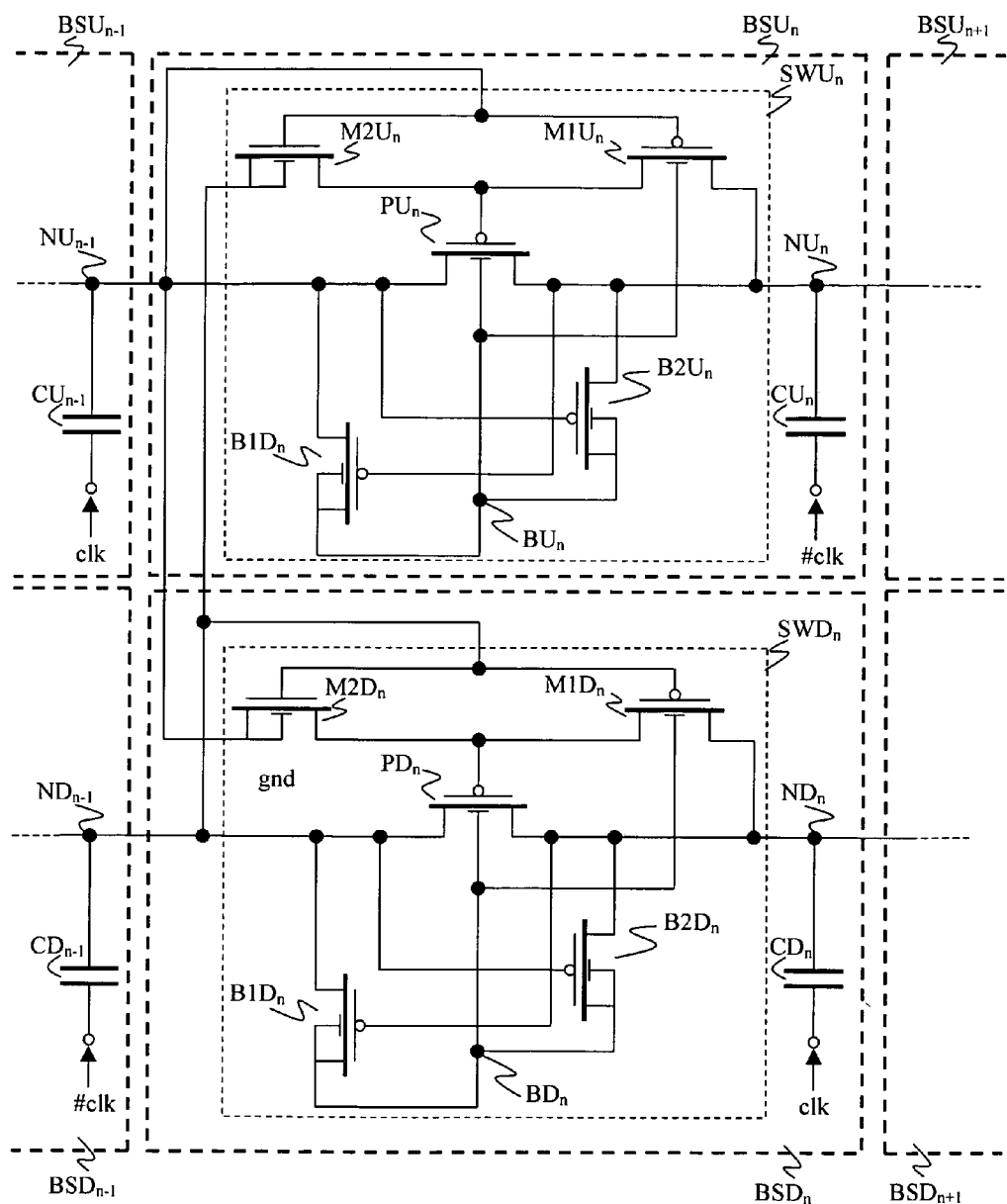
FIG. 4 is a diagram of the architecture of a pair of corresponding booster stages of the charge pump of FIG. 3 according to a second embodiment of the present invention.

FIG. 4 shows the nth pair of booster stages $BSU_n$ and $BSD_n$ according to a second embodiment of the present invention. Each booster stage, as in the first embodiment, comprises a node ($NU_{n-1}$ for the upper booster stage and $ND_{n-1}$ for the lower one) as an input node through which a charge is supplied, and a node ($NU_n$ for the upper booster stage and $ND_n$ for the lower one) as an output node from which the charge is supplied to the next (downstream) booster stage ($BSU_{n+1}$ and $BSD_{n+1}$).

The pumping capacitor $CU_n$ of the upper booster stage $BSU_n$ has a first terminal receiving the clock signal #clk (as in the first embodiment, an odd value for the index n has been assumed), and a second terminal connected to the upper output node $NU_n$. The pumping capacitor $CD_n$ of the corresponding lower booster stage $BSD_n$ has a first terminal receiving the clock signal clk, and a second terminal connected to the lower output node $ND_n$.

The controlled switches $SWU_n$ and $SWD_n$ include PMOS pass transistors ($PU_n$ for the upper stage, and $PD_n$ for the lower one) for the controlled connection between the input and the output nodes of each stage. Particularly, the source terminal of the upper pass transistor $PU_n$ is connected to the upper input node $NU_{n-1}$, the drain terminal is connected to the upper output node $NU_n$, and the body terminal is connected to a common-body node $BU_n$. The gate terminal of the upper pass transistor $PU_n$ is connected to the drain terminal of a PMOS transistor $M1U_n$ and to the drain terminal of a NMOS transistor $M2U_n$, whose purpose is to control the opening and the closing of the upper pass transistor $PU_n$, as described below. The source terminal of the transistor $M1U_n$ is connected to the upper output node $NU_n$, the body terminal is connected to the common-body node $BU_n$, and the gate terminal is connected to the upper input node $NU_{n-1}$. The source terminal of the transistor $M2U_n$ is connected to the lower input node $ND_{n-1}$ of the corresponding lower booster stage $BSD_n$, the body terminal is connected to the source terminal of the same transistor $M2U_n$, and the gate terminal is connected to the upper input node $NU_{n-1}$. Two PMOS transistors $B1U_n$ and $B2U_n$, whose purpose is to correctly bias the body terminal $BU_n$ of the upper pass transistor $PU_n$, are connected in exactly the same way as the transistors $B1_n$ and $B2_n$ of FIG. 2.

Likewise, the source terminal of the lower pass transistor $PD_n$ is connected to the lower input node $ND_{n-1}$, the drain terminal is connected to the lower output node $ND_n$, and the body terminal is connected to a common-body node $BD_n$. The gate terminal of the lower pass transistor $PD_n$ is connected to the drain terminal of a PMOS transistor $M1D_n$ and to the drain terminal of a NMOS transistor $M2D_n$, whose purpose is to control the opening and the closing of the lower pass transistor $PD_n$, as described below. The source terminal of the transistor $M1D_n$ is connected to the lower output node $ND_n$, the body terminal is connected to the common-body node $BD_n$, and the gate terminal is connected to the lower input node $ND_{n-1}$. The source terminal of the transistor $M2D_n$ is connected to the upper input node $NU_{n-1}$ of the corresponding upper booster stage $BSU_n$, the body terminal is connected to the source terminal of the same transistor $M2D_n$, and the gate terminal is connected to the lower input node $ND_{n-1}$. In this case also, two PMOS transistors $B1D_n$ and $B2D_n$ are connected in the same way as the transistors $B1_n$ and $B2_n$ of FIG. 2.

The structure of the first pair of booster stages $BSU_1$ and $BSD_1$ is similar to that of the other pairs of booster stages $BSU_n$ and $BSD_n$; the only differences are that the source terminal of the transistor $M2D_1$ receives the clock signal clk, and the source terminal of the transistor $M2U_1$ receives the clock signal #clk.

During the semi-period B, the clock signal clk takes a value equal to the supply voltage $V_{dd}$ and capacitively pulls up the voltages of the lower output node $ND_n$ and the upper input node $NU_{n-1}$ by $V_{dd}$. At the same time, the voltages of the lower input node $ND_{n-1}$ and the upper output node $NU_n$ are pulled down by $V_{dd}$ by the clock signal #clk (that during the semi-period B takes the ground value). In this phase, the transistor $M2U_n$ is turned on, because the voltage at its gate terminal is higher than the one at its source terminal by $V_{dd}$. In this way, the transistor $M2U_n$ shorts-circuit the gate terminal of the upper pass transistor $PU_n$ with the lower input node $ND_{n-1}$, having a voltage equal to the one of the source terminal of the same upper pass transistor $PU_n$ minus $V_{dd}$. Thus, the upper pass transistor $PU_n$ turns on, starting the charge transfer from the upper pumping capacitor $CU_{n-1}$ to the upper pumping capacitor $CU_n$. During the same semi-period, the transistor $M1D_n$ turns on by the voltage on its gate terminal, that is equal to the one of its source terminal minus $V_{dd}$; this forces the voltage of the lower output node $ND_n$ to the one of the gate terminal of the lower pass transistor $PD_n$, turning it off. Thus, the charge transfer from the lower pumping capacitor $CD_{n-1}$ to the lower pumping capacitor $CD_n$ is interdicted.

During the semi-period A, the clock signal clk takes a value equal to the ground voltage, and the clock signal #clk takes a value equal to the supply value $V_{dd}$. The situation in this semi-period is complementary with respect to the one described during the semi-period B, i.e., with the upper pass transistor $PU_n$ that is off, and the lower pass transistor $PD_n$ that is on.

In short, in the nth pair of booster stages $BSU_n$ and $BSD_n$ considered in FIG. 4 (that is, with an odd value for the index n), the charge transfer occurs in the lower booster stage $BSD_n$ during the semi-periods A, and in the upper booster stage $BSU_n$ during the semi-periods B.

Unlike the embodiment of the charge pump described with reference to FIGS. 1A and 2, the charge pump of FIGS. 3 and 4 is suitable for "low-voltage" transistors. In fact, the circuit of FIG. 4 is structured in such a way that each transistor of the charge pump circuit has a gate to source voltage $V_{gs}$ at most equal to the supply voltage $V_{dd}$. In this way, it is possible to operate at higher frequency than in the case of high-voltage transistors; consequently, it is possible to use pumping capacitors of smaller size, without worsening the output resistance of the charge pump, as explained below.

In comparison with a charge pump having the conventional low-voltage architecture presented above in the background section, the structure of FIGS. 3 and 4 suffers lower voltage losses due to the conduction resistance of the pass transistors. In fact, unlike the conventional charge pump, the charge transfer from a pumping capacitor to the next one occurs by a single pass transistor per stage, and not by two series-connected ones; thus, the voltage loss due to conduction resistances is ideally halved.

Figure 5:
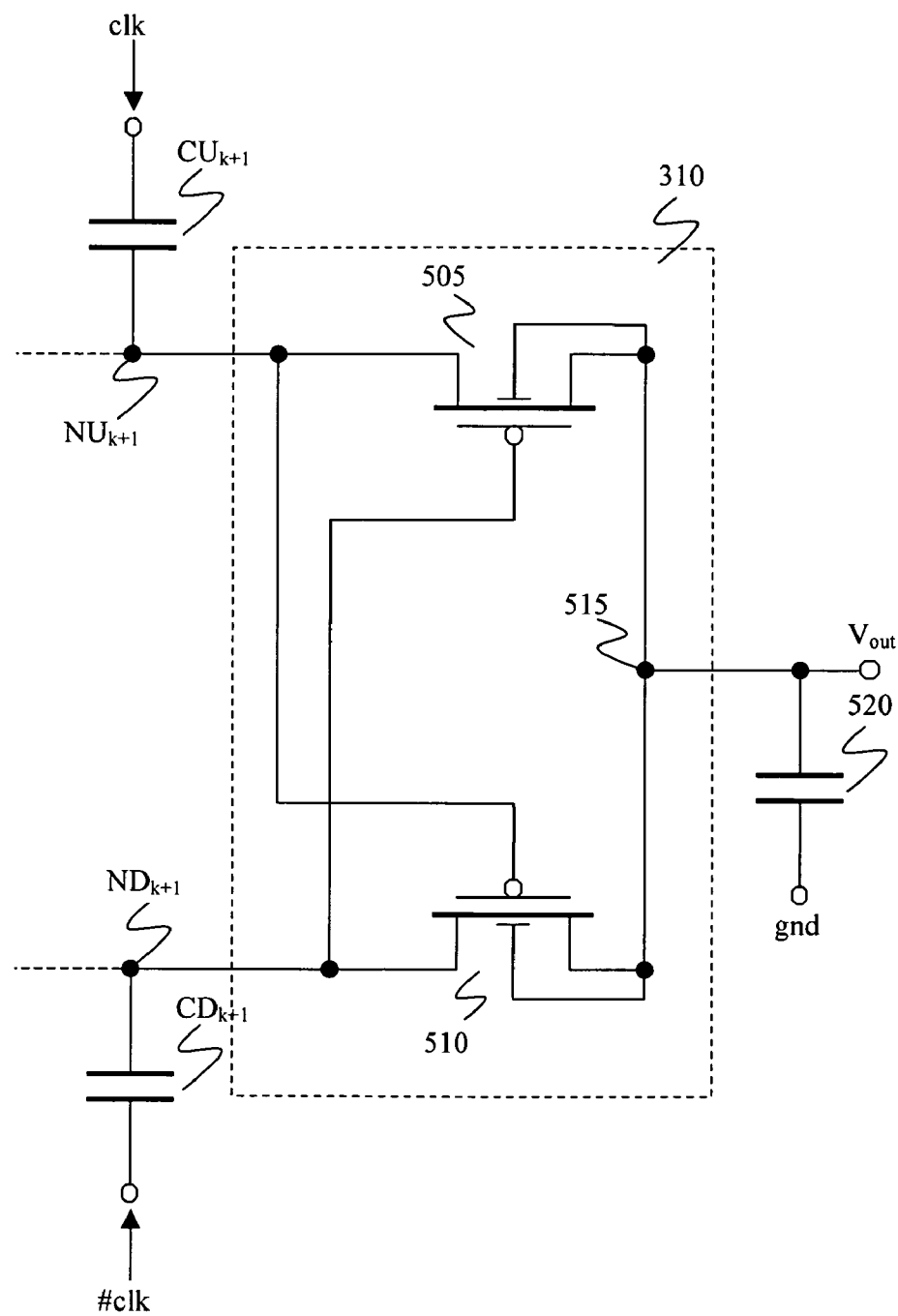
FIG. 5 is a diagram of the architecture of an exemplary output stage for the charge pump of FIG. 3.

The circuit structure of an exemplary output stage 310 is illustrated in FIG. 5. This is a non-boosting stage (i.e., without any pumping capacitor) so it is simpler than the structure of the other booster stages. The task of the output stage 310 is to transfer the boosted voltages generated in the upper branch LU and in the lower branch LD of the charge pump to an output node 515, connected to an output capacitor 520. This exemplary output stage 310 is realized in such a way that during the semi-period B the voltage $V_{out}$ at the output node 515 is the boosted voltage of the upper branch LU, and during the semi-period A the voltage at the output node 515 is the boosted voltage of the lower branch LD. To realize this function, a PMOS pass transistor 505 is connected between the output upper node $NU_{k+1}$ of the last upper booster stage $BSU_{k+1}$ and the output node 515. The gate terminal of the pass transistor 505 is connected to the output lower node $ND_{k+1}$ of the last lower booster stage $BSD_{k+1}$, in such a way that the pass transistor 505 turns on during the semi-period B. In the same way, a PMOS pass transistor 510 is connected between the output lower node $ND_{k+1}$ of the last lower booster stage $BSD_{k+1}$ and the output node 515. The gate terminal of the pass transistor 510 is connected to the output upper node $NU_{k+1}$ of the last upper booster stage $BSU_{k+1}$, in such a way that the pass transistor 510 turns on during the semi-period A.

In order to satisfy local and specific requirements, a person of ordinary skill in the art can apply to the embodiments described above many modifications and alterations. Although the present invention has been described above with a certain degree of particularity with reference to preferred embodiments thereof, it should be understood that various omissions, substitutions and changes in the form and details as well as other embodiments are possible; moreover, it is expressly intended that specific elements and/or method steps described in connection with any disclosed embodiment of the present invention may be incorporated in any other embodiment as a general matter of design choice.

For example, although in the embodiments described above the pass transistors are PMOS transistors, it is possible to use NMOS transistors for realizing a negative charge pump (with the other components of the charge pump that are accordingly updated).

Moreover, it will be apparent to those of ordinary skill in the art that additional features providing further advantages are not essential for carrying out the present invention, and may be omitted or replaced with different features.

For example, the use of transistors of a type other than MOSFET is possible.

The concepts of the present invention are also applicable when the pass transistors of the high-voltage charge pump are realized with the same size factor.

Experimental Results

To analyze the performance of a low-voltage charge pump according to an embodiment of the present invention, it has been compared under the same operating conditions (switching operating frequency f=100 MHz, duty cycle of 50% for each clock signal, supply voltage $V_{dd}$=1.2V, load resistance $R_{out}$ of 20 KΩ and output current $I_{out}$=175 µA) with the low-voltage charge pump presented in the background section in the article R. Pelliconi et al., "Power Efficient Charge Pump in Deep Submicron Standard CMOS Technology.", IEEE Journal of Solid State Circuits, vol. 38, no. 6, June 2003.

The charge pump circuit of this embodiment of the present invention has been dimensioned in such a way as to ensure the maximization of its energy efficiency. The capacitance of the pumping capacitors heavily affects its power consumption, and thus the efficiency of the whole charge pump. Consequently, it is necessary to reduce the size of the pumping capacitors as much as possible. Considering a load connected to the output terminal, and thus in the presence of an output current $I_{out}$, it has been demonstrated that the optimum capacitance is given by the following.

$$C_{opt} = \frac{I_{out}}{fV_{dd}} = 1.5 \text{ pF}$$

This value can easily be used in an integration process, and implies a substantial savings in silicon area.

The dimensioning of the pass transistors has to ensure a good charge transfer between the various booster stages. This is true when the time constant τ of the single booster stage is about a fifth of the semi-period of the clock signals. A good result has been achieved with the following value.

$$\left(\frac{W}{L}\right)_{pass} = 16$$

Each examined charge pump had four pairs of booster stages (four upper booster stages and four lower booster stages), plus an output stage.

The following table shows the results of the simulations for the comparison between the low-voltage charge pump of this embodiment of the present invention and the conventional charge pump described in the background section.

|  | Conventional Charge Pump | Charge Pump of This Embodiment |
|---|---|---|
| Stages | 4 | 4 |
| Pumping capacitance | 1.5 pF | 1.5 pF |
| Capacitive load | 1 pF | 1 pF |
| Resistive load | 20 KΩ | 20 KΩ |
| Operating frequency | 100 MHz | 100 MHz |
| Max output voltage | 3.46 V | 3.53 V |
| Energetic efficiency | 46.7% | 49.5% |
| Ripple | 260 mV | 265 mV |
| Rising time | 300 ns | 200 ns |

The greatest improvement with respect to the conventional charge pump is represented by the energetic efficiency (η), that results near 50%. More particularly, it is given by the following.

$$\eta = \frac{P_{in}}{P_{out}} * 100 \cong 49.5\%$$

(the input and output powers are obtained as an average of the voltage-current products after a transient period). This improvement is practically constant as the requested output current $I_{out}$ changes.

Another great improvement with respect to the conventional charge pump is represented by a shorter rising time of the output voltage (about 50% in this example).

The output voltage is close to that provided by theory. In fact, neglecting the parasitic capacitance of the intermediate nodes, the following results.

$$V_{out} = (k+1)V_{dd} - \frac{kI_{out}}{2fC}$$

(C represents the value of the pumping capacitance). In the case of four stages, and with $I_{out}$=175 µA, it results that $V_{out}$=3.67V, close to the simulated results.

The charge pump according to this embodiment of the present invention, without a connected load (that is, without output current), allows the reaching of an output voltage equal to 5.9V, a value that is close to the theoretical value of 6V (the difference is caused by the parasitic capacitance on the intermediate nodes).

The charge pump according to this embodiment takes up a silicon area of about 0.015 mm². The conventional charge pump takes up a similar area.

FIGS. 6A to 9B show comparisons between the charge pump according to this embodiment of the present invention and the conventional charge pump in greater detail.

Figure 6A:
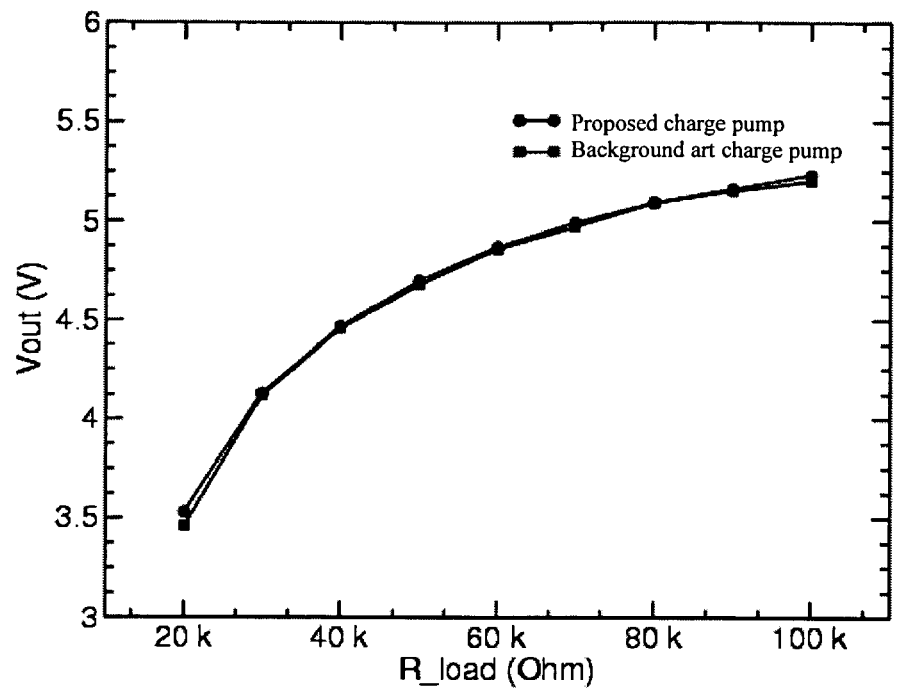
FIGS. 6A-9B are diagrams showing the results of comparisons between a conventional low-voltage charge pump and a low-voltage charge pump according to a preferred embodiment of the present invention.

Particularly, FIG. 6A is a diagram showing a comparison between the output voltage of the low-voltage charge pump according to this embodiment and the conventional charge pump depending on the resistive load (operating frequency equal to 100 MHz, supply voltage equal to 1.2V).

Figure 6B:
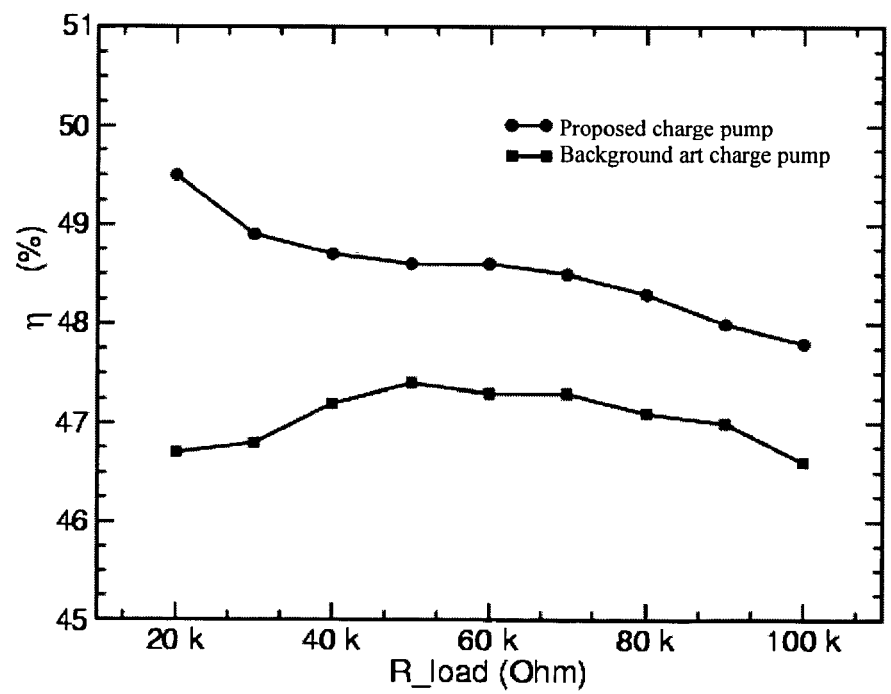

FIG. 6B is a diagram showing a comparison between the efficiency of the low-voltage charge pump according to this embodiment and the conventional charge pump depending on the resistive load (operating frequency equal to 100 MHz, supply voltage value equal to 1.2V).

Figure 7A:
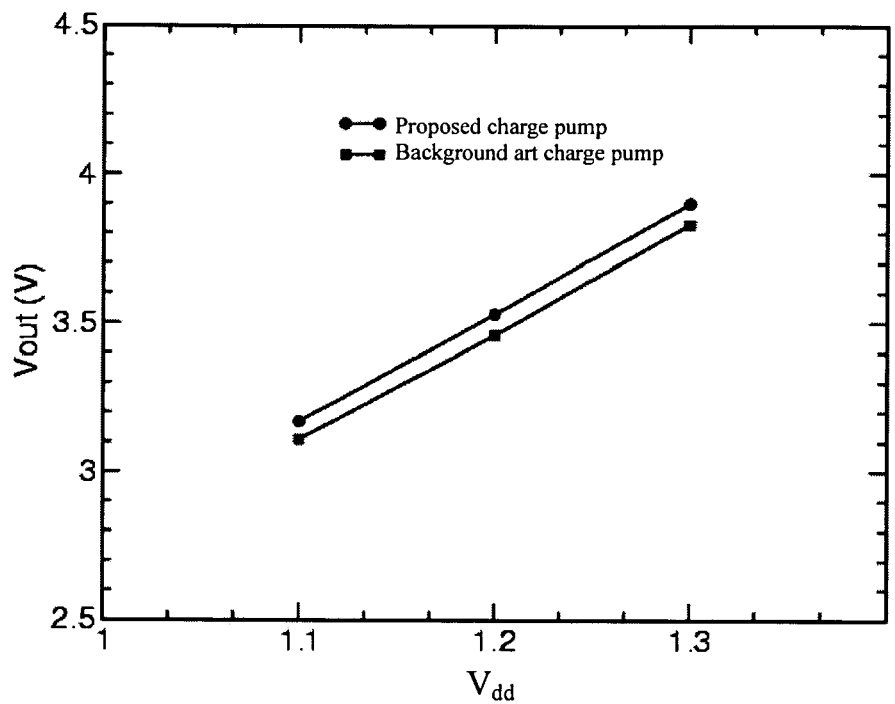

FIG. 7A is a diagram showing a comparison between the output voltage of the low-voltage charge pump according to this embodiment and the conventional charge pump depending on the supply voltage (operating frequency equal to 100 MHz, resistive load equal to 20 KΩ).

Figure 7B:
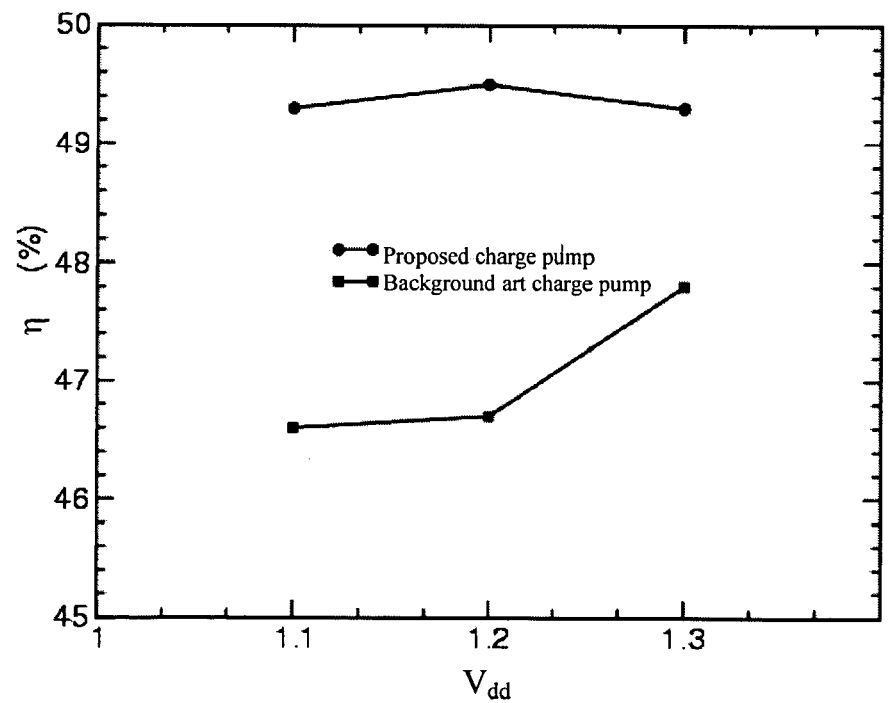

FIG. 7B is a diagram showing a comparison between the efficiency of the low-voltage charge pump according to this embodiment and the conventional charge pump depending on the supply voltage (operating frequency equal to 100 MHz, resistive load equal to 20 KΩ).

The following figures refer to charge pumps with a number of booster stages equal to ten.

Figure 8A:
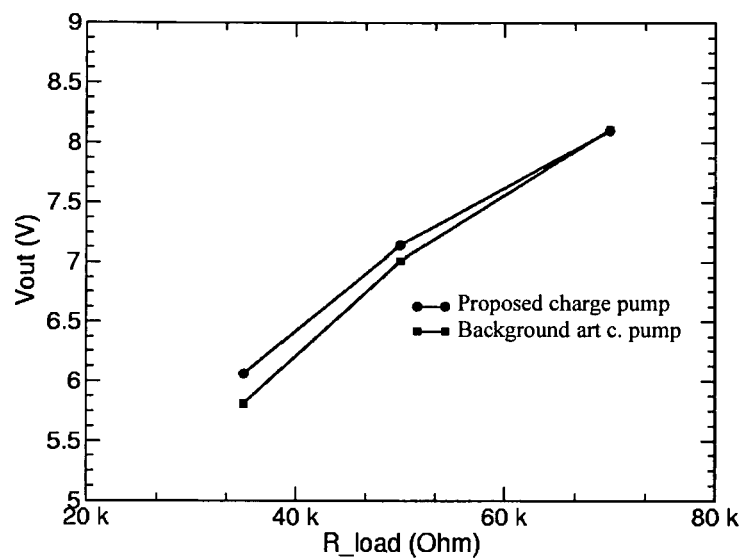

FIG. 8A is a diagram showing a comparison between the output voltage of a low-voltage charge pump according to an embodiment of the present invention and the conventional charge pump depending on the resistive load (operating frequency equal to 80 MHz, supply voltage equal to 1.2V).

Figure 8B:
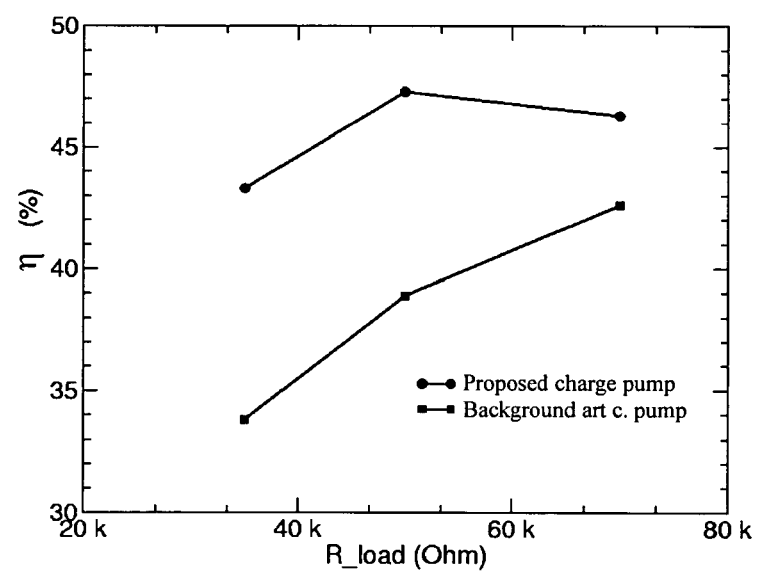

FIG. 8B is a diagram showing a comparison between the efficiency of the low-voltage charge pump according to this embodiment and the conventional charge pump depending on the resistive load (operating frequency equal to 80 MHz, supply voltage value equal to 1.2V)

Figure 9A:
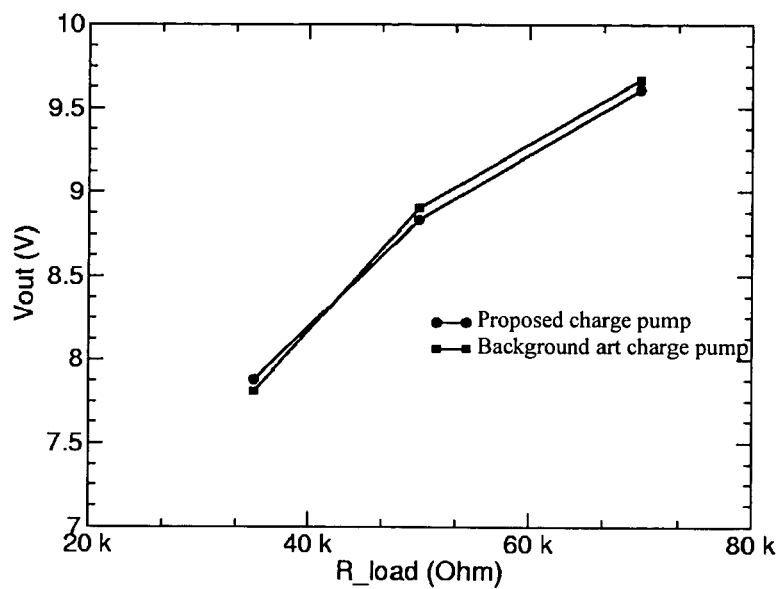

FIG. 9A is a diagram showing a comparison between the output voltage of the low-voltage charge pump according to this embodiment and the conventional charge pump depending on the resistive load (operating frequency equal to 150 MHz, supply voltage equal to 1.2V).

Figure 9B:
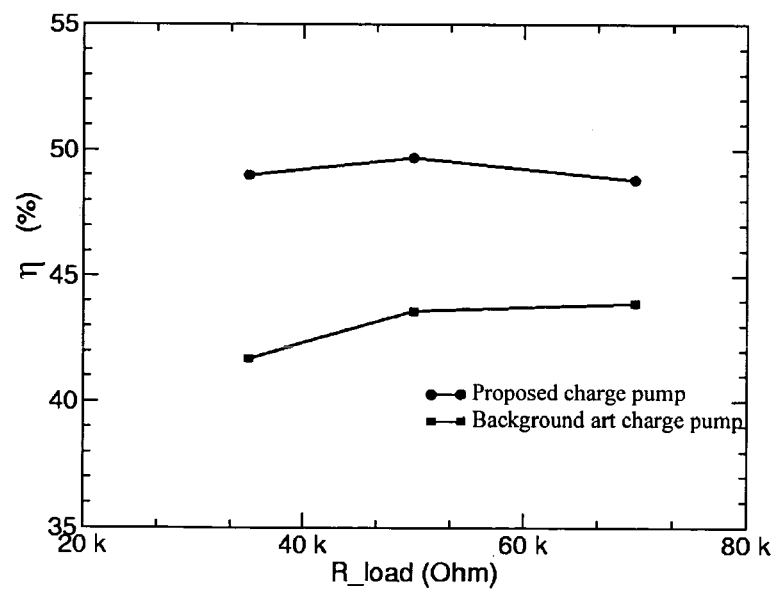

FIG. 9B is a diagram showing a comparison between the efficiency of the low-voltage charge pump according to this embodiment and the conventional charge pump depending on the resistive load (operating frequency equal to 150 MHz, supply voltage equal to 1.2V).

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A two-phase charge pump capable of being controlled by first and second clock signals that are in phase-opposition, the charge pump comprising:
   a plurality of cascade-connected stages, each of the stages including:
      a capacitive element driven by one of the clock signals such that the capacitive elements of adjacent stages are driven by different clock signals;
      a pass transistor coupled to the capacitive element of the stage, the pass transistor selectively transferring electric charge to the capacitive element of the stage from the capacitive element of a previous stage;
      a first biasing circuit enabling the pass transistor of the stage during a first phase of the one clock signal, the first biasing circuit coupling the one clock signal to the pass transistor, the first biasing circuit being active during an entire semi-period in which the pass transistor is conductive, and the first biasing circuit supplying the one clock signal directly to a gate of the pass transistor so as to directly bias the gate of the pass transistor; and
      a second biasing circuit disabling the pass transistor of the stage during a second phase of the one clock signal.

2. The charge pump according to claim 1,
   wherein the capacitive element of the stage has a first terminal receiving the one clock signal and a second terminal,
   the pass transistor of the stage is a transistor of a first type having a first terminal connected to the second terminal of the capacitive element of the stage, a second terminal connected to the second terminal of the capacitive element of the previous stage, and a control terminal connected to the first and second biasing circuits, and
   the first biasing circuit selectively couples the control terminal of the pass transistor of the stage to a clock terminal that provides the one clock signal.

3. The charge pump according to claim 2, wherein the first biasing circuit includes a first biasing transistor of a second type, which is opposite to the first type, having a first terminal connected to the control terminal of the pass transistor of the stage, a second terminal connected to the clock terminal, and a control terminal that receives a reference voltage.

4. The charge pump according to claim 3, wherein the second biasing circuit selectively couples the control terminal of the pass transistor of the stage to the second terminal of the capacitive element of the stage.

5. The charge pump according to claim 4, wherein the second biasing circuit includes a second biasing transistor of the first type having a first terminal connected to the control terminal of the pass transistor of the stage, a second terminal connected to the second terminal of the capacitive element of the stage, and a control terminal connected to the second terminal of the pass. transistor of the stage.

6. The charge pump according to claim 5, wherein each of the transistors is a MOSFET transistor whose first terminal is a drain terminal and second terminal is a source terminal.

7. The charge pump according to claim 1, wherein pass transistor of each of the stages has a shape factor that is smaller than the shape factor of the pass transistor of the previous stage.

8. A two-phase charge pump capable of being controlled by first and second clock signals that are in phase-opposition, the charge pump comprising:
two branches that each include a plurality of cascade-connected stages, each of the stages of one branch having a corresponding stage in the other branch, and each of the stages of the one branch being coupled to the corresponding stage in the other branch, each of the stages including:
a capacitive element driven by one of the clock signals such that the capacitive elements of adjacent stages of each branch are driven by different clock signals;
a pass transistor coupled to the capacitive element of the stage, the pass transistor selectively transferring electric charge to the capacitive element of the stage from the capacitive element of a previous stage;
a first biasing circuit enabling the pass transistor of the stage during a first phase of the one clock signal, the first biasing circuit coupling an input voltage of the corresponding stage to the pass transistor of the stage; and
a second biasing circuit disabling the pass transistor of the stage during a second phase of the one clock signal.

9. The charge pump according to claim 8,
wherein the capacitive element of the stage has a first terminal receiving the one clock signal and a second terminal,
the pass transistor of the stage is a transistor of a first type having a first terminal connected to the second terminal of the capacitive element of the stage, a second terminal connected to the second terminal of the capacitive element of the previous stage, and a control terminal connected to the first and second biasing circuits, and
the first biasing circuit selectively couples the control terminal of the pass transistor to the second terminal of the pass transistor of the corresponding stage.

10. The charge pump according to claim 9, wherein the first biasing circuit includes a first biasing transistor of a second type, which is opposite to the first type, having a first terminal connected to the control terminal of the pass transistor of the stage, a second terminal connected to the second terminal of the pass transistor of the corresponding stage, and a control terminal connected to the second terminal of the pass transistor of the stage.

11. The charge pump according to claim 10, wherein the second biasing circuit selectively couples the control terminal of the pass transistor of the stage to the second terminal of the capacitive element of the stage.

12. The charge pump according to claim 11, wherein the second biasing circuit includes a second biasing transistor of the first type having a first terminal connected to the control terminal of the pass transistor of the stage, a second terminal connected to the second terminal of the capacitive element of the stage, and a control terminal connected to the second terminal of the pass transistor of the stage.

13. The charge pump according to claim 12, wherein each of the transistors is a MOSFET transistor whose first terminal is a drain terminal and second terminal is a source terminal.

14. A two-phase charge pump capable of being controlled by first and second clock signals that are in phase-opposition, the charge pump comprising:
a plurality of cascade-connected stages, each of the stages including:
a capacitive element driven by one of the clock signals such that the capacitive elements of each pair of adjacent stages are driven by different clock signals;
a pass transistor coupled to the capacitive element of the stage, the pass transistor selectively transferring electric charge to the capacitive element of the stage from the capacitive element of a previous stage;
a first biasing transistor enabling the pass transistor of the stage during a first phase of the one clock signal, the first biasing transistor coupling the one clock signal to the pass transistor of the stage, the first biasing circuit being active during an entire semi-period in which the pass transistor is conductive, and the first biasing circuit supplying the one clock signal directly to a gate of the pass transistor so as to directly bias the gate of the pass transistor; and
a second biasing transistor disabling the pass transistor of the stage during a second phase of the one clock signal.

15. The charge pump according to claim 14, wherein the pass transistor of each of the stages has a shape factor that is smaller than the shape factor of the pass transistor of the previous stage.

16. A two-phase charge pump capable of being controlled by first and second clock signals that are in phase-opposition, the charge pump comprising:
two branches that each include a plurality of cascade-connected stages, each of the stages of one branch having a corresponding stage in the other branch, and each of the stages of the one branch being coupled to the corresponding stage in the other branch, each of the stages including:
a capacitive element driven by one of the clock signals such that the capacitive elements of adjacent stages of each branch are driven by different clock signals;
a pass transistor coupled to the capacitive element of the stage, the pass transistor selectively transferring electric charge to the capacitive element of the stage from the capacitive element of a previous stage;
a first biasing transistor enabling the pass transistor of the stage during a first phase of the one clock signal, the first biasing transistor coupling an input voltage of the corresponding stage to the pass transistor of the stage; and
a second biasing transistor disabling the pass transistor of the stage during a second phase of the one clock signal.

17. The charge pump according to claim 16, wherein the pass transistor of each of the stages has a shape factor that is smaller than the shape factor of the pass transistor of the previous stage.

18. A method of operating a two-phase charge pump controlled by first and second clock signals that are in phase-opposition, the charge pump having a plurality of cascade-connected stages, the method comprising, for each of the stages, the steps of:
driving a capacitive element with one of the clock signals such that the capacitive elements of each pair of adjacent stages are driven by different clock signals;
selectively transferring electric charge to the capacitive element of the stage from the capacitive element of a previous stage through a pass transistor;
enabling the pass transistor of the stage during a first phase of the one clock signal and disabling the pass transistor of the stage during a second phase of the one clock signal;

causing a first biasing circuit to be active during an entire semi-period in which the pass transistor is conductive; and supplying the one clock signal from the first biasing circuit directly to a gate of the pass transistor so as to directly bias the gate of the pass transistor.

19. The method according to claim 18, wherein the enabling step includes the sub-step of coupling the clock signal to the pass transistor of the stage.

20. A method of operating a two-phase charge pump controlled by first and second clock signals that are in phase-opposition, the charge pump having two branches that each include a plurality of cascade-connected stages, the method comprising, for each of the stages, the steps of:

driving a capacitive element with one of the clock signals such that the capacitive elements of adjacent stages are driven by different clock signals;

selectively transferring electric charge to the capacitive element of the stage from the capacitive element of a previous stage through a pass transistor; and enabling the pass transistor of the stage during a first phase of the one clock signal and disabling the pass transistor of the stage during a second phase of the one clock signal, wherein each of the stages of one branch has a corresponding stage in the other branch, and each of the stages of the one branch is coupled to the corresponding stage in the other branch.

21. The method according to claim 20, wherein the enabling step includes the sub-step of coupling an input voltage of the corresponding stage to the pass transistor of the stage.

* * * * *